United States Patent
Greene

(10) Patent No.: US 6,781,814 B1
(45) Date of Patent: Aug. 24, 2004

(54) CAPACITIVE PRESSURE TRANSDUCER

(75) Inventor: Stephen P. Greene, Coventry, RI (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/700,229

(22) Filed: Nov. 3, 2003

(51) Int. Cl.[7] ............................................. H01G 7/00
(52) U.S. Cl. ................. 361/283.1; 361/283; 361/283.4; 361/283.3; 361/303; 361/305; 361/306.1
(58) Field of Search ............................... 361/283.1, 283, 361/283.3, 283.4, 303, 305, 306.1, 306.3, 277, 278, 280, 284, 286, 321.1–321.5

(56) References Cited

U.S. PATENT DOCUMENTS

| | | | | |
|---|---|---|---|---|
| 4,442,474 A | * | 4/1984 | de Jong et al. ........... | 361/283.4 |
| 4,982,351 A | | 1/1991 | Kawate et al. | |
| 5,656,780 A | * | 8/1997 | Park ........................... | 73/724 |
| 5,760,311 A | * | 6/1998 | Friberg ....................... | 73/724 |

* cited by examiner

*Primary Examiner*—Dean A. Reichard
*Assistant Examiner*—Nguyen T. Ha
(74) *Attorney, Agent, or Firm*—Russell E. Baumann; Frederick J. Telecky, Jr.

(57) ABSTRACT

A capacitive fluid pressure transducer (10') has a sensing element (12) received in an electrically conductive cup-shaped shield member (24) which is crimped onto the base of an electrical connector (20'). A conditioning circuit (14) is received in a circuit chamber formed between the sensor element and the connector and is provided with a tab carrying a conductive trace for electrical connection of the shield member with the circuit. The shield member is received in an electrically insulating sleeve (28) which in turn is received in a cavity formed in a metallic, high strength hexport housing so that the shield member is electrically isolated from the hexport housing. A gasket (26) disposed between the sensing element (12) and the bottom wall of the shield member may be formed of electrically conductive material to provide a conductive path electrically connecting a conductive coating on the pressure sensing surface of the sensing element with the conditioning circuit to provide fluid shift correction.

6 Claims, 1 Drawing Sheet

CAPACITIVE PRESSURE TRANSDUCER

FIELD OF THE INVENTION

This invention relates generally to condition responsive sensors and more particularly to fluid pressure responsive capacitive transducers.

BACKGROUND OF THE INVENTION

A known fluid pressure responsive capacitive transducer, as shown in U.S. Pat. No. 4,982,351, assigned to the assignee of the present invention, the subject matter of which is incorporated herein by this reference, comprises a capacitive pressure sensing element having a thin ceramic diaphragm mounted in closely spaced, sealed overlying relation to a ceramic base and having metal coatings deposited on respective opposing surfaces of the diaphragm and the base to serve as capacitor plates arranged in predetermined closely spaced relation to each other to form a capacitor. Sensing element terminals connected to the capacitor plates are arranged at an opposite surface of the sensing element base and a signal conditioning electrical circuit connected to the sensing element terminals is mounted on the sensing element.

A connector body of electrically insulating material is fitted over the electrical circuit and is secured to a metal housing having a cavity in which the sensing element is received. The metal housing is formed with a port for connection to a fluid pressure source to be monitored and a flexible O-ring is seated in the metal housing around the port with the sensing element biased against the O-ring to form a fluid seal and to define a fluid receiving recess with the diaphragm exposed to fluid in the recess. In that arrangement, the diaphragm is movable in response to variations in pressure applied to the diaphragm to vary the capacitance of the capacitor in accordance with the changes in applied pressure and the electrical circuit provides an electrical output signal corresponding to the applied pressure.

As shown in FIG. 1, capacitive transducers are made in which the metal housing is in the form of a threaded port member having a polygonal, such as hexagonal, outer surface configuration to facilitate mounting of the transducer. In order to provide DC isolation, it is known to electrically couple the port member to the power supply through selected capacitors 14c (FIG. 3) by providing an electrical trace on a tab extending from the electronic circuit and received between the connector and that portion of the port member which is crimped onto the connector thereby making effective electrical connection with the electrical trace on the tab. Higher frequency AC passes from the port member to the power supply causing the sidewalls of the port member which define the cavity in which the sensing element is received to act as a shield against electromagnetic interference (EMI).

It is also known to coat the fluid receiving surface of the diaphragm with gold or the like and to electrically couple that to the electronic circuit by taking a gasket formed of electrically conductive material and placing it between the gold plated sensing surface and the port member, which, as noted above, is electrically connected to the electronic circuit. This connection provides for fluid shift correction required for sensing certain fluids, e.g., conductive fluids.

However, certain types of electrical noise can be conducted to the conditioning circuit by means of an AC signal and cause an unpredictable voltage output. For example, in certain heavy truck applications, communication between sensor units is accomplished through a power line carrier at about 130 K Hz. AC voltage potentials between circuit ground and the port member, at frequencies below 1 M Hz, cause output voltage fluctuations at multiples of the clock frequency of the ASIC of the conditioning circuitry, typically around 80 KHZ.

SUMMARY OF THE INVENTION

It is an object of the present invention to provide a fluid pressure sensor free of the above noted prior art limitations. Another object is the provision of a fluid pressure sensing capacitive transducer in which EMI (electromagnetic interference) shielding is provided as well as a conductive path for fluid shift gold plating in the transducer's capacitive sensing element and both AC and DC isolation of the conditioning circuit.

Briefly, in accordance with the invention, the capacitive sensing element of the transducer is received in an electrically conductive cup member having a bottom wall formed with a fluid receiving aperture therethrough and an upstanding wall having a free distal end which is crimped onto the end of the connector of the transducer. The cup member is placed within a sleeve of electrically insulating material and the sleeved cup is then placed in the cavity of a port member and connected thereto by crimping the outer free end of the wall of the port member forming the cavity through the insulating sleeve member. Pressure transducers made in accordance with the invention provide EMI shielding by means of the electrically conductive cup capacitively coupled to the conditioning circuit as well as both AC and DC isolation of the conditioning circuit from the port member. If desired, fluid shift correction can be provided by means of a conductive path from a conductive coating disposed on the outer face of the diaphragm of the capacitive sensing element through a conductive gasket disposed between the diaphragm and the electrically conductive cup.

BRIEF DESCRIPTION OF THE DRAWINGS

Other objects, advantages and details of the novel and improved pressure sensing transducer of this invention appear in the following detailed description of preferred embodiments of the invention, the detailed description referring to the drawings in which.

DETAILED DESCRIPTION OF PREFERRED EMBODIMENTS

Figure 1:
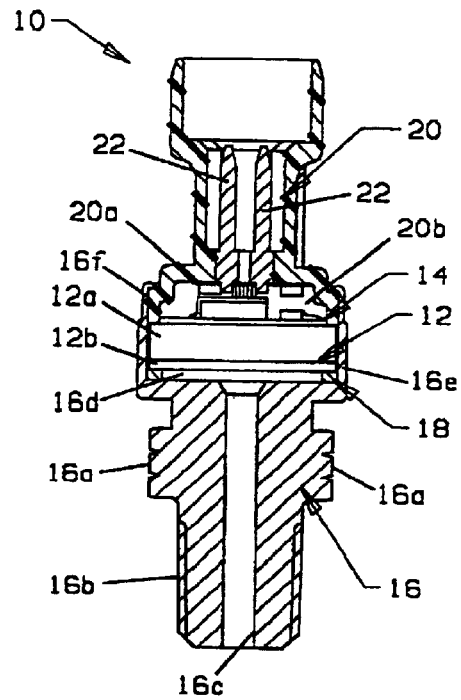
FIG. 1 is an elevational cross sectional view of a capacitive pressure transducer made in accordance with the prior art.

Referring to the drawings, numeral 10 in FIG. 1 indicates a capacitive pressure sensing transducer made in accordance with the prior art comprising a capacitive pressure sensing element 12 which includes a ceramic base 12a formed of alumina or the like and diaphragm 12b of like material which is mounted on the base in closely spaced, sealed overlying relation thereto. Thin metal coatings (not shown) are disposed on opposing inner surfaces of the base and diaphragm which serve as capacitive plates. Electrical leads (not shown) extend from the coatings up through the base for attachment to conditioning electronics 14, to be discussed. Sensing element 12 is received in a cavity 16d formed in the port member, such as a hexport housing 16 formed of suitable material, such as stainless steel. Hexport housing 16 has a base portion preferably formed with hexagonally disposed flat surfaces 16a to facilitate installation using threaded coupling portion 16b. A fluid receiving passageway or port 16c extends through the coupling portion 16b up to cavity 16d formed by circumferentially extending sidewall 16e.

Figure 3:
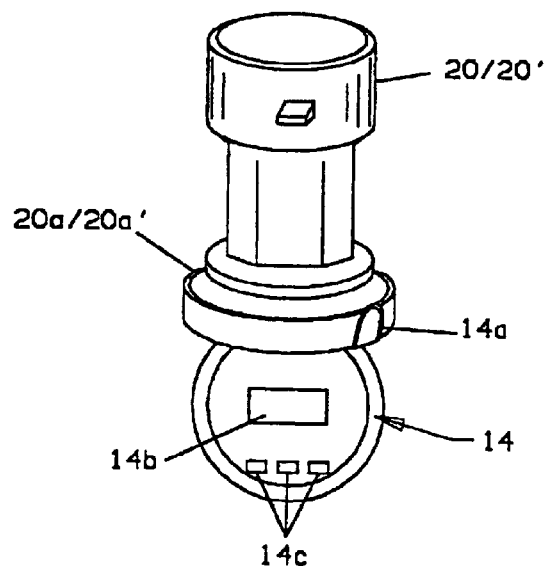
FIG. 3 is a perspective view of a connector and a portion of a flexible circuit board of the FIGS. 2 and 3 transducer (20 and 20', respectively).

A gasket 18 serves to space sensing element 12 from the bottom wall of cavity 16d, forming a fluid receiving chamber, as well as a sealing member. Gasket 18 also may be formed of electrically conductive material to provide a conductive path from a conductive outer surface of diaphragm 12b, e.g., a gold plating, through housing 16 to a conductive tab 14a (see FIG. 3) of conditioning circuitry 14. The distal end of wall 16e is attenuated at 16f to facilitate crimping attachment to a connector 20 which also makes an electrical connection with the tab 14a. This conductive path from the fluid receiving surface of sensing element 12 to the conditioning circuit enables correction of a phenomena called fluid shift which occurs when certain fluids are being sensed. That is, conductive fluids which create parasitic capacitance that affect the output voltage.

Connector 20 is formed of suitable electrically insulating material and has a base portion 20a formed with a recess 20b which receives conventional conditioning electronics 14, noted above. Connector 20 mounts transducer terminals 22, two of which are shown, for attachment to conditioning electronics 14. The attenuated wall portion 16f, as noted above, is crimped over the outer peripheral portion of base 20a of the connector to complete the assembly of the sensor.

Although capacitive pressure transducer 10 is very effective for many applications, a problem can occur caused by certain AC voltage potentials between circuit ground and the hexport housing. For example, with relation to ASIC 14b (FIG. 3) of one type of conditioning circuit used in transducers of FIG. 1, unpredictable output voltage fluctuations are caused at multiples of the ASIC's clock frequency, around 80 K Hz. Such AC voltage potentials can occur, for example, in truck chassis in which electrical communication is conducted among a plurality of units mounted in the chassis.

Figure 2:
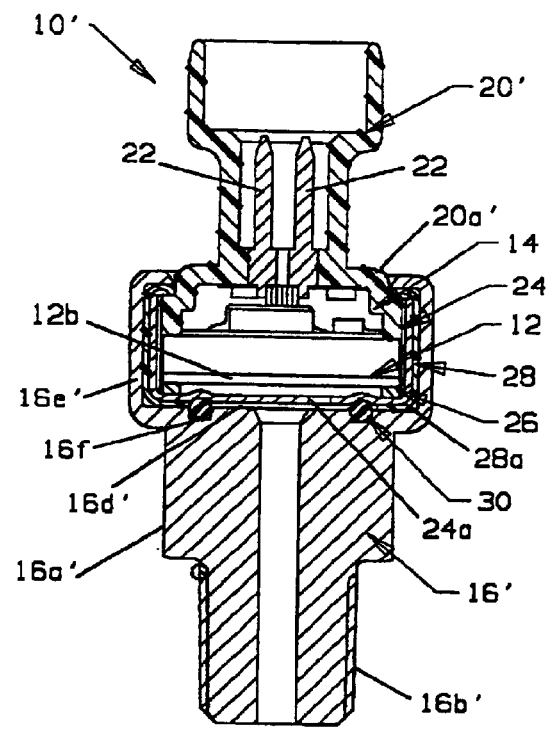
FIG. 2 is a similar view of a capacitive pressure transducer made in accordance with a preferred embodiment of the invention.

With reference to FIG. 2, a capacitive pressure transducer 10' made in accordance with the invention comprises an internal EMC shield 24 formed of electrically conductive material, such as brass or steel. Shield 24 is generally cup-shaped having a bottom wall and a circumferential sidewall extending therefrom and being of a size to closely fit within the cavity 16d' formed by sidewall 16e' of hexport housing 16'. A fluid receiving aperture 24a is formed in the bottom wall and an annular sealing gasket 26 of suitable elastomer material is received on top of the bottom wall of shield 24 close to the sidewall thereof.

Capacitive sensing element 12, the circuit board for conditioning electronics 14 and gasket 26 are received in cup shaped shield 24 along with base 20a' of connector 20' with the distal free end of the sidewall of shield 24 crimped over onto a flange portion of base 20a'.

A sleeve 28 of electrically insulating material, preferably a high temperature polymer such as polytetrafluoroethylene, is placed around cup-shaped shield 24 and this assembly is in turn placed in cavity 16d' of the hexport housing electrically separated from the housing by sleeve 28 along with O-ring 30 disposed on the bottom wall of the cavity, for example, in annular groove 16f, the O-ring also serving as a fluid seal member. Sleeve 28 is also preferably formed with a radially inwardly extending portion 28a at the bottom of the sleeve to ensure electrical separation of the cup-shaped shield from the bottom wall defining the cavity. The upper free end of sidewall 16e' is bent inwardly over the previously crimped cup-shaped shield to form a supplemental crimp connection with connector base 20a' through the crimped cup-shaped shield and the upper portion of sleeve 24 which has a length sufficiently long to ensure electrical separation of the crimped portion of wall 24 from the crimped portion of wall 16e' of the hexport housing. As in the FIG. 1 structure, hexport housing 16' is preferably provided with an outer hexagonal configuration 16a', a threaded coupling portion 16b' and sidewall 16e' defining cavity 16d'.

As noted in connection with the FIG. 1 sensor, if desired, transducer 10' can include a fluid shift correction feature. Capacitive sensing element 12 can be provided with a conductive layer of gold or the like on the outer surface of diaphragm 12b and gasket 26 can be formed of electrically conductive material, such as a silver loaded polymer, for electrically connecting the conductive layer on element 12 to shield 24 through conductive gasket 26. Shield 24 is connected to conditioning circuit 14 through tab 14a once the cup-shaped shield is crimped to base 20a' of the connector. This connection also capacitively couples shield 24 to circuit 14 through capacitors 14c (FIG. 3) allowing the shield to function as an EMC shield; however, as noted above, sleeve 28 provides total AC and DC isolation of conditioning circuit 14 from hexport housing 16'.

Thus, capacitive pressure transducers made in accordance with the invention provide both AC and DC isolation of the conditioning circuitry from the support in which the transducers are mounted while permitting the use of a robust, high strength metal port fitting as well as providing EMI shielding and fluid shift correction.

It should be understood that although a particular preferred embodiment of the invention has been described by way of illustrating the invention, the invention includes all modifications and equivalents thereof falling within the scope of the appended claims.

What is claimed:

1. A fluid pressure sensor comprising
   a capacitive pressure sensing element having a first surface to be exposed to a fluid pressure source to provide a capacitance value which varies with the fluid pressure applied,
   conditioning circuitry for converting the capacitance to output voltage signals,
   an electrically insulating connector and transducer terminals, the connector mounting the terminals for connection to the conditioning circuitry, the connector having a head portion forming a circuit chamber in which the conditioning circuitry is disposed,
   an electrically conductive cup-shaped member having a bottom wall formed with a fluid receiving aperture and a circumferential sidewall extending from the bottom wall to a free end portion, the pressure sensing element and head portion of the connector received in the cup-shaped member with the free end portion of the circumferential wall crimped to the head portion, the cup-shaped member being electrically connected to the conditioning circuitry,
   an electrically insulating sleeve, the cup-shaped member received in the sleeve, and a metal housing having first and second ends, the first end formed with a circumferential wall having a free distal end portion, the wall of the housing forming a cavity, a coupling portion of the housing formed with a fluid passage extending from the second end to the cavity, the cup-shaped member, head portion of the connector and insulating sleeve received in the cavity of the housing with the free distal end portion of the wall of the housing crimped onto the head portion and electrically separated from the housing by the electrically insulating sleeve.

2. A fluid pressure sensor according to claim 1 in which the cavity of the housing has a bottom wall and the sleeve extends between at least a portion of the bottom wall of the housing and the cup-shaped member.

3. A fluid pressure sensor according to claim 1 further comprising a circuit substrate, the conditioning circuitry being mounted on the circuit substrate, the substrate having a tab including a conductive trace extending from the conditioning circuitry, at least a portion of the tab being disposed between the head portion of the connector and the crimped portion of the cup-shaped member to electrically connect the conductive trace of the conditioning circuitry with the cup-shaped member.

4. A fluid pressure sensor according to claim 1 further comprising an annular gasket disposed between the bottom wall of the cup-shaped member and the first surface of the capacitive pressure sensing element.

5. A fluid pressure sensor according to claim 4 in which the gasket is electrically conductive.

6. A fluid pressure sensor according to claim 1 in which the cavity of the housing has a bottom wall and further comprising an O-ring received on the bottom wall of the housing between the bottom wall of the housing and the cup-shaped member.

* * * * *